United States Patent [19]
de Vos et al.

[11] 4,099,223
[45] Jul. 4, 1978

[54] LIGHTING FIXTURE ARRANGEMENT

[75] Inventors: Hendrik A. J. de Vos, Swansea; Walter A. Gustafson, Fall River; Elzear R. Labouliere, Swansea, all of Mass.

[73] Assignee: GTE Sylvania Incorporated, Stamford, Conn.

[21] Appl. No.: 759,341

[22] Filed: Jan. 14, 1977

[51] Int. Cl.² .................... F21S 1/02; F21V 21/00; F21S 1/06
[52] U.S. Cl. .................................. 362/226; 362/387; 362/408
[58] Field of Search ............... 240/52.1, 85 R, 85 A, 240/85 B, 85 C, 85 D, 85 E, 78 E, 78 G; 362/226, 418, 429, 430, 404, 406, 407, 408

[56] References Cited

U.S. PATENT DOCUMENTS

| | | | |
|---|---|---|---|
| 1,175,498 | 3/1916 | Anderson | 240/52.1 X |
| 1,742,438 | 1/1930 | D'Olier, Jr. | 240/85 R |
| 2,689,909 | 9/1954 | Dazley | 240/52.1 X |
| 3,681,596 | 8/1972 | Taylor et al. | 240/78 E |

*Primary Examiner*—J D Miller
*Assistant Examiner*—Peter S. Wong
*Attorney, Agent, or Firm*—Peter Xiarhos

[57] ABSTRACT

A lighting fixture arrangement including a lighting fixture suspended from a supporting structure at a first height, and a hanger arrangement located remotely from the lighting fixture and attached to a supporting structure at a second, lower height. The lighting fixture includes a power supply assembly and an optical assembly suspended from the power supply assembly and adapted to receive operating voltages over a cable for operating the optical assembly to illuminate a first area or region beneath the fixture. In accordance with the invention the optical assembly is capable of being removed, or separated, from the rest of the fixture and carried together with its associated cable to the remote hanger arrangement and suspended from the hanger arrangement to illuminate a second area or region beneath the hanger arrangement. The hanger arrangement does not have, and does not require, a power supply assembly of its own, thereby reducing the required mounting space in the vertical dimension.

3 Claims, 5 Drawing Figures

LIGHTING FIXTURE ARRANGEMENT

BACKGROUND OF THE INVENTION

The present invention relates to a lighting fixture arrangement and, more particularly, to a lighting fixture arrangement particularly suitable for use in horticultural greenhouse lighting applications.

Lighting fixtures for use in horticultural lighting applications, including greenhouse lighting applications, are well known to those skilled in the art. These lighting fixtures generally include a power supply housing assembly containing power supply components for the fixture, a lamp socket assembly attached to the power supply housing assembly and including a socket within which a lamp (e.g., a high intensity discharge lamp) is received, and a reflector attached to the lamp socket assembly for distributing the light output of the lamp in a particular light distribution pattern. A lighting fixture as described hereinabove is normally mounted or suspended from a supporting structure, for example, ceiling grid-work of a greenhouse, by means of an elongated supporting rod or chain attached to the power supply housing assembly of the fixture.

While lighting fixtures as described hereinabove are suitable for a wide variety of horticultural lighting applications, including greenhouse applications, the components thereof are quite large, resulting in rather large and tall units, for example, 2–3 feet in length. Thus, when these fixtures are used with rather lengthy supporting rods, for example, 2–3 feet, a substantial amount of overhead or ceiling space is required to properly and effectively illuminate areas or regions beneath the fixture. Accordingly, if it is desired to provide lighting in areas or regions where there is little available overhead or ceiling space to accommodate the aforementioned lighting fixtures and supporting rods, for example, at the sides of a greenhouse having the usual sloping glass roofs, lighting fixtures as described hereinabove cannot be used very effectively, if at all.

BRIEF SUMMARY OF THE INVENTION

In accordance with the present invention, a lighting fixture arrangement is provided which includes a lighting fixture capable of being used in applications where substantial mounting space is not available, for example, at sloping sides of a greenhouse. The lighting fixture arrangement in accordance with the invention generally includes a lighting fixture and a hanger arrangement spaced remotely from the lighting fixture and mounted to a supporting structure.

The lighting fixture of the invention generally includes a power supply means operative to produce operating voltages, and an optical assembly means suspended from the power supply means for producing a predetermined output light pattern for illuminating an area adjacent to the lighting fixture. An elongated cable is coupled between the power supply means and the optical assembly means for coupling operating voltages produced by the power supply means to the optical assembly means for causing the optical assembly means to produce its predetermined output light pattern. A support means supports the lighting fixture as discussed hereinabove from a supporting structure.

The optical assembly means of the invention includes release means for releasably suspending the optical assembly means from the power supply means and, further, the cable is selected to have a length to permit the optical assembly means to be moved to the location of the hanger arrangement following removal of the optical assembly means from the power supply means. The hanger arrangement further includes means for enabling the optical assembly means to be releasably suspended therefrom whereby the optical assembly means is capable of producing its predetermined output light pattern for illuminating a second area adjacent to the hanger arrangement and the optical assembly means.

BRIEF DESCRIPTION OF THE DRAWING

Various objects, features and advantages of a lighting fixture arrangement in accordance with the present invention will be apparent from the following detailed discussion taken in conjunction with the accompanying drawing in which.

DETAILED DESCRIPTION OF THE INVENTION

Figure 1:
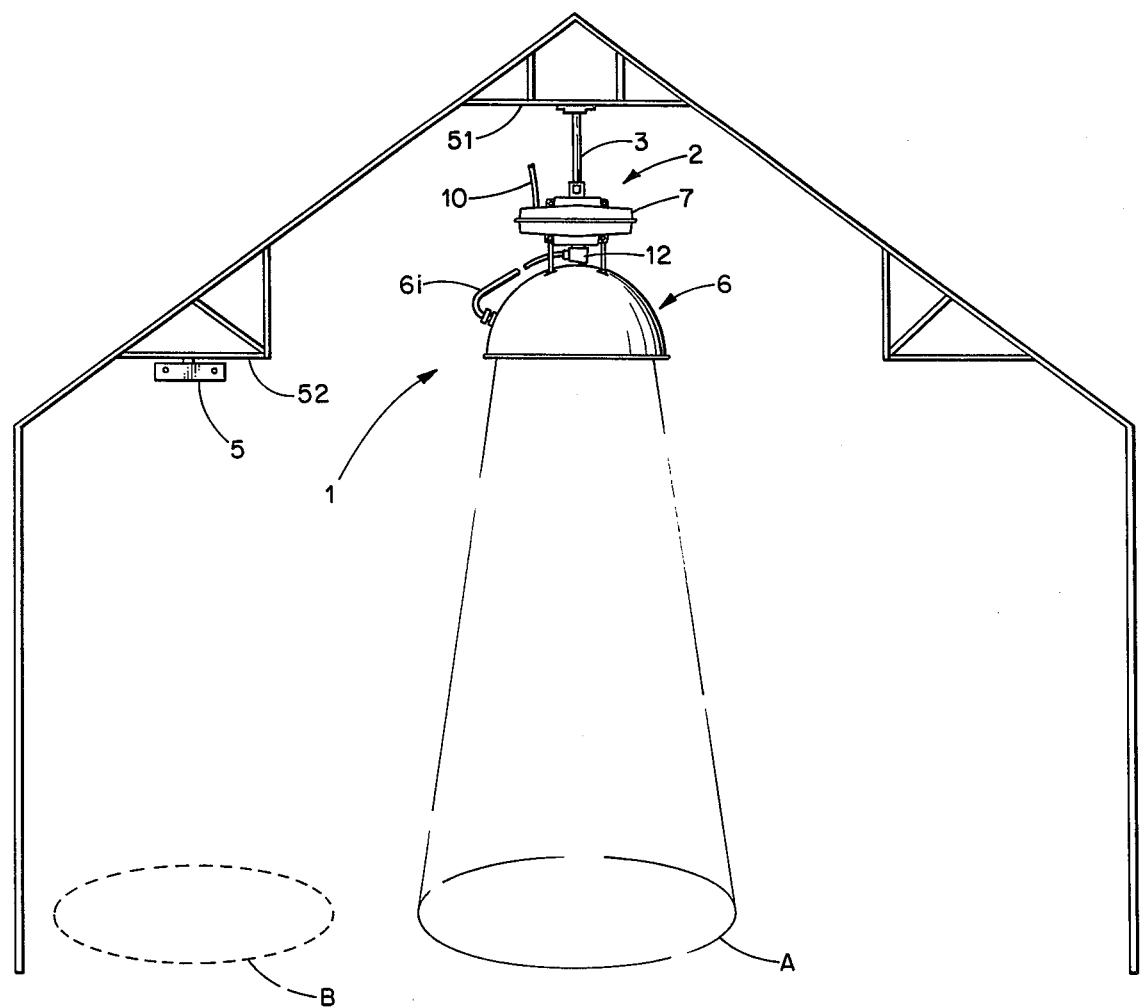
FIG. 1 is a view illustrating a lighting fixture arrangement including a lighting fixture and a hanger arrangement in accordance with the present invention.

Referring now to FIG. 1 there is shown a lighting fixture arrangement 1 in accordance with the present invention. As shown in FIG. 1, the lighting fixture arrangement 1 includes a lighting fixture 2 suspended from a first supporting structure 51 by means of an elongated supporting rod 3. A hanger arrangement 5 is spaced from the lighting fixture 2 and attached to a second supporting structure 52. The supporting structures 51 and 52 may represent, by way of example, two different levels of a ceiling grid system of a conventional greenhouse. The lighting fixture 2 is intended to be used in accordance with the invention to illuminate a first area or region underlying the lighting fixture 2 as shown at A in FIG. 1 and, further, includes a removable optical assembly 6 which, as will be described in detail hereinafter, may be removed or separated the rest of the lighting fixture 2 and used with the hanger arrangement 5 to illuminate a second area or region underlying the lighting fixture, as shown at B in FIGS. 1 and 5.

Figure 3:
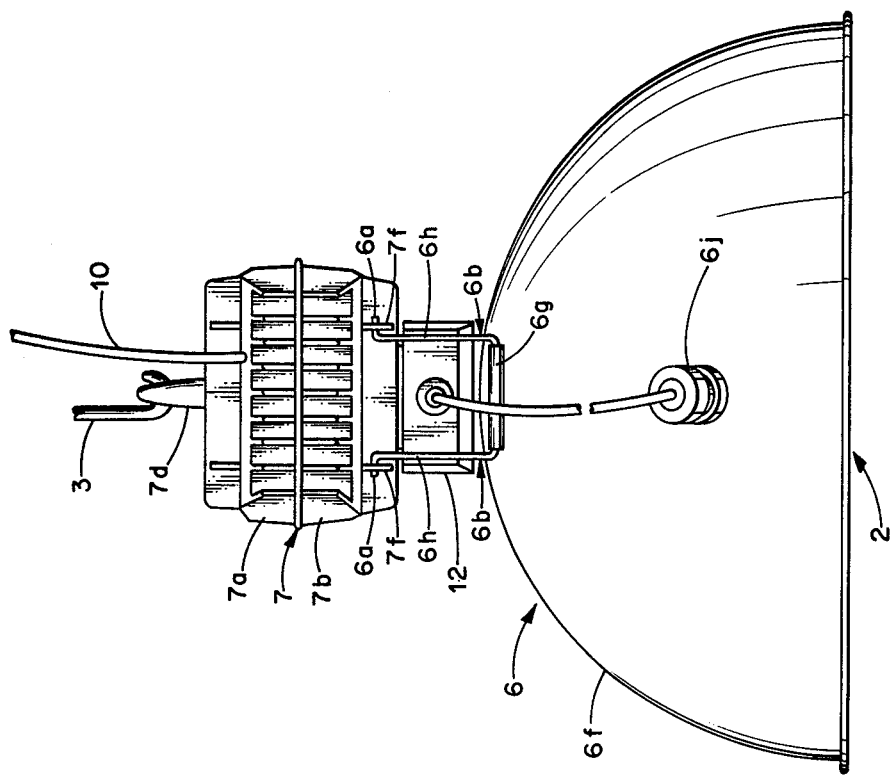
FIGS. 2 and 3 are front and side views, respectively, of the lighting fixture, including a removable optical assembly, as employed in the lighting fixture arrangement in accordance with the invention.
Figure 2:
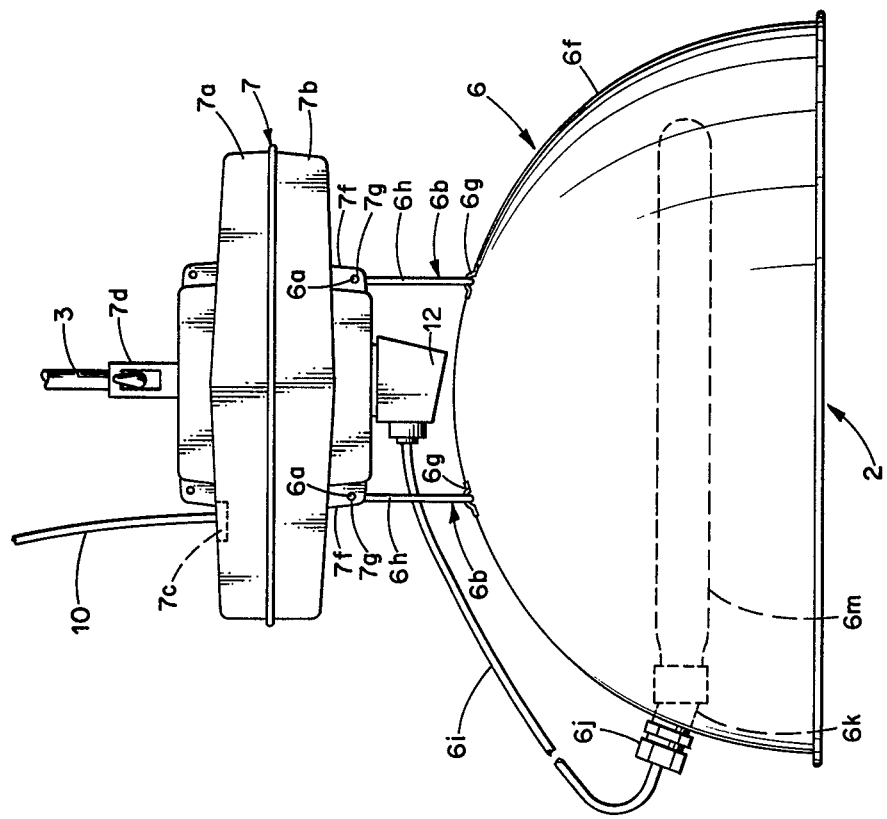

The lighting fixture 2 is shown in detail in FIGS. 2 and 3 and includes, in addition to the abovementioned removable optical assembly 6, a power supply housing assembly 7. The power supply housing assembly 7, typically of cast aluminum, is employed to house the power supply components for the fixture 2, such as a ballast transformer and associated regulating capacitor (not shown), and includes an upper portion 7a and a lower portion 7b within which the power supply components are physically located and housed. The upper and lower portions 7a and 7b of the fixture 2 may be joined together by any suitable means such as by standard nut and bolt arrangements (not shown). The upper portion 7a of the fixture 2 further has an opening 7c (FIG. 2) therein by which a power supply cable 10 may be introduced into the interior of the portions 7a and 7b for supplying operating voltages for the power supply components housed within the power supply housing assembly 7. The upper portion 7a further has an attachment member 7d secured thereto and also connected with the aforementioned supporting rod 3 (FIG. 1) for suspending the fixture 2 from a supporting structure, for example, a ceiling grid structure at the aforementioned level 51 as shown in FIG. 1.

The lower portion 7b of the power supply housing assembly 7 further has two pairs of opposed, thin support elements or ears 7f integral therewith. These ears have openings 7g therein within which bent ends 6a of a pair of generally U-shaped spring members 6b are received for supporting the aforementioned optical assembly 6 from the power supply housing assembly 7 of the fixture 2. The spring members 6b are typically of a resilient spring wire material and are secured against a reflector 6f of the optical assembly 6 by means of a pair of generally U-shaped clamps 6g loosely overlying horizontal portions 6c and attached to the reflector 6f, as by welding. As will be described more fully hereinafter, the optical assembly 6 may be removed, or separated, from the rest of the fixture 2 and used with the aforementioned hanger arrangement 5 (FIGS. 1, 4 and 5) by simply squeezing together the vertical portions 6h of the spring members 6b until the bent free ends 6a thereof withdraw from the openings 7g in the support ears 7f. When the free ends 7a of the spring members 6b have been removed from the openings 7g, the members 6b, by virtue of their loose coupling with the reflector 6f, are able to pivot within their respective clamps 6g, thereby facilitating the handling of the spring members 6b.

The lighting fixture 2 as described hereinabove further includes a wiring box 12 secured to the lower portion 7b of the main housing assembly 7, intermediate to the lower portion 7b and the reflector 6f of the optical assembly 6. The wiring box 12 is electrically connected to the power supply components within the power supply housing assembly 7 and is adapted to supply operating voltages generated by the power supply components over a cable 6i to the optical assembly 6. As shown in FIG. 2, the cable 6i, which may have a length of up to 50 feet, is connected at its remote end, via a cable retainer 6j, to a lamp socket 6k secured within the interior of the reflector 6f. A lamp 6m, such as a high-pressure sodium lamp, is threaded into the lamp socket 6k and cooperates with the reflector 6f for achieving the desired light distribution pattern for the fixture 2.

Figure 4:
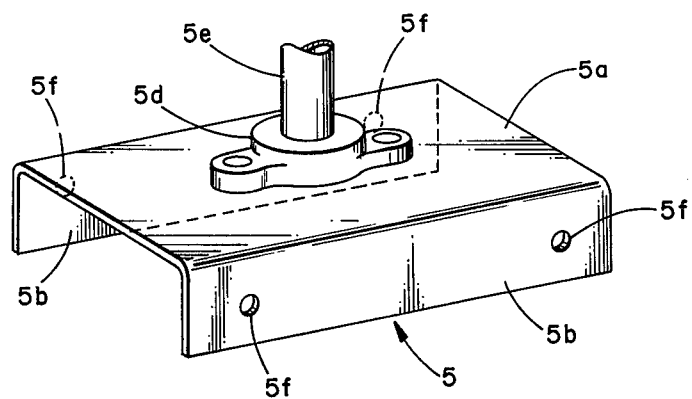
FIG. 4 is a perspective, enlarged view of the hanger arrangement as employed in the lighting fixture arrangement in accordance with the invention.

The hanger arrangement 5 with which the optical assembly 6 of the lighting fixture 2 may be used is shown in detail in FIG. 4. As shown in FIG. 4, the hanger arrangement 5a includes flat top portion 5a and a pair of parallel flat side portions 5b integral with and extending downwardly from the sides of the top portion 5a. The top portion 5a further has an attachment member 5d secured thereto for connection with a supporting rod 5e which, in turn, is attached to a supporting structure such as a ceiling grid structure at the aforementioned level 52 as shown in FIG. 1. The side portions 5b of the hanger arrangement 5 further have openings 5f in corner regions thereof for receiving the bent ends 6a of the spring members 6b whereby the optical assembly 6 may be suspended from the hanger arrangement 5.

Figure 5:
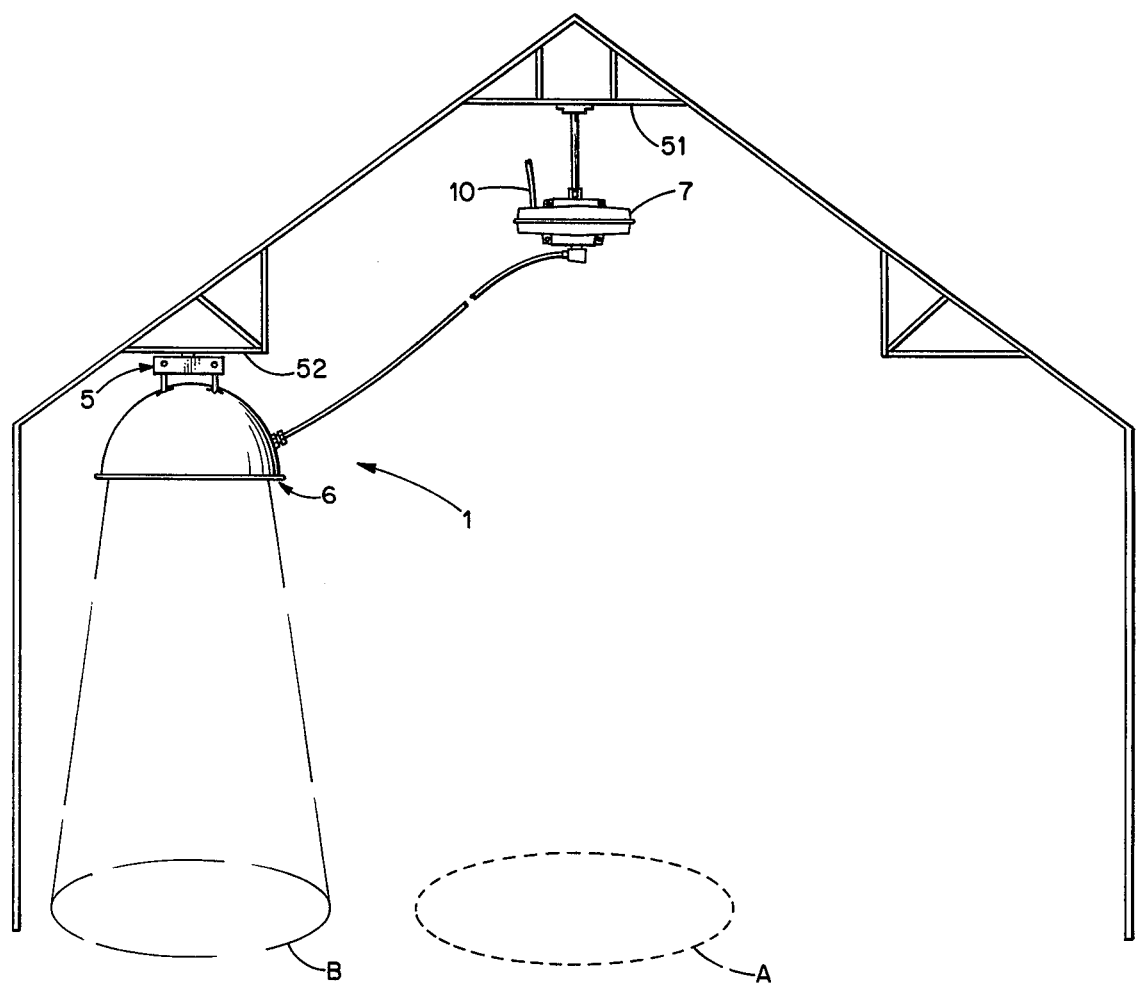
FIG. 5 is a view illustrating the manner in which the optical assembly of the lighting fixture may be employed with the hanger arrangement.

As indicated previously, there are lighting applications such as greenhouse horticultural lighting applications where, due to restrictions of ceiling space, it is either difficult or impossible to use existing lighting fixtures and supporting rods because of their excessive overall length. In accordance with the present invention, this problem is resolved by making the optical assembly 6 removable or separable from the rest of the lighting fixture 2 and accompanied by a cable 6i of substantial length (e.g., up to 50 feet), and by the provision of the aforedescribed hanger arrangement 5. Thus, in accordance with the invention, if it is desired to illuminate an area or region B as shown in FIGS. 1 and 5 where the ceiling structure is at a level 52 below the level 51 of the ceiling structure to which the fixture 2 is attached, it is only necessary to remove the optical assembly 6 from the fixture 2, by removing the free bent ends 6a of the spring members 6b from their associated openings 7g in the support ears 7f of the power supply housing assembly 7, and carrying the optical assembly 6 to the location of the hanger arrangement 5 and suspending the optical assembly 6 from the hanger arrangement 5 by inserting the free bent ends 6a of the spring members 6b within the openings 5f in the hanger arrangement 5. It is to be particularly noted that the hanger arrangement 5 does not have, and does not require, any power supply housing assembly or power supply components of its own, relying instead on the power supply housing assembly 7 of the fixture 2 and the power supply components contained within the power supply housing assembly 7. Further, by avoiding the need for a power supply housing assembly for the hanger arrangement 5, there is a saving in the vertical dimension of a height nearly equal to the entire height of the power supply housing assembly 7 of the fixture 2. Further, the hanger arrangement 5 may be used with a supporting rod 5e of short length, for example, a few inches, or, if desired, without a supporting rod at all, in which case the attachment member 5d is no longer needed and the hanger arrangement 5 may be attached directly to the overhead ceiling structure via its top portion 5a, thereby resulting in an even greater savings in the height in the vertical dimension. Although not indicated in the drawings, several hanger arrangements such as described herein and shown at 5 can be located selectively at different levels throughout a particular building structure, such as a greenhouse, and used with or without supporting rods of appropriate lengths for illuminating several areas or regions like those shown at A and B in the drawings. In this manner, where selective lighting is required or desirable, either in terms of lighting areas or lighting times, a single lighting fixture such as shown at 2 may be used to illuminate selectively several areas at different times, thereby resulting in a savings of fixture costs. Other obvious variations, such as using several fixtures 2 with several hanger arrangements 5, are also possible.

Although there has been described what is considered to be a preferred embodiment of the invention, it will be obvious to those skilled in the art that various changes and modifications may be made therein without departing from the invention as called for in the appended claims.

What is claimed is:
1. A lighting fixture arrangement comprising:
a lighting fixture including:
power supply means operative to produce operating voltages, said power supply means including a housing having supporting elements extending outwardly therefrom having first and second pairs of opposed openings therein;

optical assembly means for producing a predetermined output light pattern, said optical assembly means including:
a reflector;
a lamp-receiving socket means disposed within the reflector for receiving a lamp therein;
a pair of flexible resilient releasable spring members each having a pair of ends capable of being flexed with respect to each other to allow said ends to be inserted into and withdrawn from a corresponding one of the pairs of openings in the supporting elements of the housing of the power supply means for respectively suspending and releasing the optical assembly means from the power supply means; and
securing means fixedly and pivotally securing the spring members to the reflector for allowing the spring members to pivot thereby to facilitate the insertion and withdrawal of the spring members from the openings in the supporting elements of the housing of the power supply means;
an elongated cable coupled between the power supply means and the lamp-receiving socket means of the optical assembly means for coupling operating voltages produced by the power supply means to the lamp-receiving socket means and to a lamp received within the lamp-receiving socket means, said cable being operative when the optical assembly means is suspended from the power supply means to supply voltages to the optical assembly means to cause the optical assembly means to produce its predetermined output light pattern for illuminating an area adjacent to the lighting fixture, said cable being at all times completely external to the lighting fixture; and
support means for supporting the lighting fixture from a supporting structure; and
a hanger arrangement spaced remotely from the lighting fixture and mounted to a supporting structure, said hanger arrangement including portions having first and second pairs of opposed openings therein for receiving the ends of the spring members of the optical assembly means;
said cable having a length to permit the optical assembly means to be moved from the lighting fixture to the location of the hanger arrangement following release of the optical assembly means from the power supply means whereby the ends of the pair of resilient spring members may then be inserted into the pairs of openings in the hanger arrangement to suspend the optical assembly means from the hanger arrangement and thereby enable the optical assembly means to produce its predetermined output pattern for illuminating a second area adjacent to the hanger arrangement and the optical assembly means.

2. A lighting fixture arrangement in accordance with claim 1 wherein:
the support means of the lighting fixture supports the lighting fixture from a supporting structure at a first height; and
the hanger arrangement is attached to a supporting structure at a second height less than the first height.

3. A lighting fixture arrangement in accordance with claim 2 wherein:
the cable has a length of up to 50 feet.

* * * * *